US006880095B2

(12) United States Patent
Cromer et al.

(10) Patent No.: US 6,880,095 B2
(45) Date of Patent: Apr. 12, 2005

(54) SWITCHING POWER PLANES OF EXTERNAL DEVICE INTERFACES IN A COMPUTING SYSTEM IN RESPONSE TO CONNECTION STATUS

(75) Inventors: Daryl Carvis Cromer, Apex, NC (US); Howard Jeffrey Locker, Cary, NC (US); Andy Lloyd Trotter, Raleigh, NC (US); James Peter Ward, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 627 days.

(21) Appl. No.: 10/055,054

(22) Filed: Jan. 23, 2002

(65) Prior Publication Data

US 2003/0140262 A1 Jul. 24, 2003

(51) Int. Cl.[7] ................................................ G06F 1/26
(52) U.S. Cl. .................. 713/300; 713/340; 307/85; 307/86; 323/271; 323/285
(58) Field of Search ................................ 713/300, 340; 323/271, 285; 307/85, 86

(56) References Cited

U.S. PATENT DOCUMENTS

| | | |
|---|---|---|
| 3,414,806 A | 12/1968 | Carr |
| 3,611,261 A | 10/1971 | Gregory |
| 4,903,340 A | 2/1990 | Sorensen |
| 4,915,649 A | 4/1990 | Shimazu et al. |
| 5,061,204 A | 10/1991 | Murakami |
| 5,127,847 A | 7/1992 | Kato et al. |
| 5,273,456 A | 12/1993 | Muzslay |
| 5,347,265 A | 9/1994 | Shimura |
| 5,463,261 A | 10/1995 | Skarda et al. |
| 5,606,704 A | 2/1997 | Pierce et al. |
| 5,674,085 A | 10/1997 | Davis et al. |
| 5,754,870 A | 5/1998 | Pollard et al. |
| 5,757,171 A * | 5/1998 | Babcock ..................... 323/271 |
| 5,944,831 A | 8/1999 | Pate et al. |
| 6,149,464 A | 11/2000 | DeBauche et al. |
| 6,415,387 B1 * | 7/2002 | Aguilar et al. ............. 713/320 |

OTHER PUBLICATIONS

P. J. Klim, P. Le, and H. Vega, Circuit for Detecting Disconnection and Connection of a Pluggatle Unit, *IBM Technical Disclosure Bulletin*, vol. 38, No. 06B, Jun. 1983, pp. 371–372.

* cited by examiner

*Primary Examiner*—Rehana Perveen
(74) *Attorney, Agent, or Firm*—Ronald V. Davidge; Carlos Munoz-Bustamante (57) ABSTRACT

A computing system includes a motherboard including one or more connection subsystems, each of which includes a port connector and a device interface circuit conditioning signals transmitted or received through the port connector. The port connector includes a connection-sensing terminal, which is connected to ground through a cable, and which is allowed to float to a voltage supplied through a pull-up resistor when the cable is disconnected. The motherboard also includes a main voltage plane supplying electrical power to a separate voltage plane for each device interface circuit only when a cable is connected to the port connector which is also connected to the device interface circuit.

20 Claims, 4 Drawing Sheets

SWITCHING POWER PLANES OF EXTERNAL DEVICE INTERFACES IN A COMPUTING SYSTEM IN RESPONSE TO CONNECTION STATUS

BACKGROUND INFORMATION

1. Field of the Invention

This invention relates to power management in a computing system, and, more particularly, to a method and apparatus for switching electrical power to a device interface circuit of the system in response to a determination of whether a device is connected to the system through the circuit.

2. Background Information

The length of time during which a portable computing system can be operated with an internal battery, without a need for connection to an external power source, often determines the usefulness of the computing system. Efforts to increase the length of this time have been centered around the development of power management routines, which attempt to minimize the use of electrical power while responding to the actual conditions management routine drives a computing system into a suspense mode when a prescribed time has elapsed since the last external input to the computing system. Since external device interface circuits, which are associated with the various individual Input/Output (I/O) ports of a portable computing system, are known to require levels of electrical power that are sufficient to cause a reduction in the time during which the system can be used without recharging its battery, some power management routines reduce the power supplied to such circuits when the interface is not in use. However, what is needed is a power management routine having a capability to completely shut down electrical power to a device interface circuit when the interface is not in use, particularly as indicated by the lack of a cable from an external device connected to operate through the interface.

The use of portable computing systems has created an increasing need to change the configuration of a computing system on a frequent basis. For example, a portable computer may be disconnected from various external devices in an office, taken home for use and night, and reconnected to the external devices in the office the next morning. Such an increased need to unplug and replug cable connections leads to an increased probability that some cables will be left unplugged. While conventional operating systems and device drivers display error messages indicating that an external device may unplugged, such messages are based, for example, on not receiving an acknowledgment or other response from the external device in a predetermined time, or on not receiving data signals expected to be received from the external device. Since such conditions may be caused by a number of factors, including various types of failures occurring in the external device, there is a need to develop a more specific way to determine when the cable is unplugged, so that a more specific and accurate message can be given.

An increasing use is also being made of external devices that can be safely connected to and disconnected from a computing system without turning electrical power off in the computing system. What is needed is a method recognizing the connection or disconnection of a cable to an external device when the system power is left on. Such a determination should be made on a continuous or periodic basis, without relying on a power-on reset routine to make a proper determination.

U.S. Pat. No. 6,149,464, the disclosure of which is incorporated herein by reference describes the use, in a computing system, of a port connector provided with a flexible electrical contact for determining the presence of the electrically grounded flange of a cable connector that may be attached to the port connector. Using this feature, the computing system can determine whether a peripheral device is attached to the port connector by means of a cable. While modification of the port connector to provide the additional contact is required, this method has the advantage of working with a standard cable connector having an electrically grounded shield to make electrical contact with the additional contact. Thus, what is needed is a method for determining whether an external cable is connected without requiring modification of the port connector and further without placing a restriction on the type of cable connector requiring a grounded shield, which is not present on some conventional cable connectors.

U.S. Pat. No. 6,149,464 also describes the use of a switchable power supply, having an ability to switch various of its outputs from an "on" condition to an "off" condition, together with the ability of the computing system to recognize which, if any, ports are connected to peripheral devices, to turn off electrical power to individual port control circuits associated with ports not connected to such devices. However, what is needed is a method providing such a capability without requiring the use of a power supply having such switchable outputs. It is particularly desirable that such a method could be controlled by a power management routine executing within the processor of the computing system that the apparatus associated with the method can be confined to the motherboard of the computing system, without requiring changes or special features within the power supply.

While U.S. Pat. No. 6,149,464 also describes the use of a determination that an external device is not connected to the computing system in the presentation of a suitable error message, this message is presented only in response to a previous detection of an error regarding the use of the external device. What is needed is a method presenting a disconnection error message directly in response to an attempt to use the external device, without first relying on another type of error detection.

While U.S. Pat. No. 6,149,464 also describes the use of a determination of whether a cable to an external device is connected to determine whether to load a device driver, this is only done as the device drivers are loaded, typically during an initialization process following power-on. Since many external devices may be disconnected without turning power off, what is needed is method for unloading a device driver in response to disconnection of a cable to an external device.

U.S. Pat. Nos. 5,463,261 and 5,606,704 describe power conservation circuits for peripheral interface modules, such as a PC cards (formerly called PCMCIA cards). The peripheral interface module is designed for use with a peripheral device that is coupled to the module via a peripheral device plug. A sensing means senses whether the plug engages the socket as an indication of whether the module is actually in use. In response, switching means disconnects power to the module when the plug does not engage the socket and connects this power when the plug engages the socket.

U.S. Pat. No. 5,784,870 describes a system including a computer and a plug-in card, having a remote data link, which draws power from the computer. Power to the card is controlled in response to a status monitor showing whether the data link and its connector are operable for data communications.

U.S. Pat. No. 5,944,831 describes a power management method in a computer system having a PC card connected to a communication channel, with the method including detecting a disconnection of the communication channel from the PC card and terminating power supplied to the PC card in response to the detection of the disconnection of the communication device.

U.S. Pat. No. 5,347,265 describes information processing apparatus including a main control unit detachably attached as a board into the main body of the apparatus. A detection circuit detects whether the main control unit is attached by determining whether an operation panel in the main body of the apparatus has received an initialization command from the main control unit.

The patent literature also includes a number of patents describing methods for modifying a cable connector configuration to provide a signal indicating whether a mating connector is attached to the cable connector, with the use of the signal not being disclosed, or with the signal being used to provide an indication of disconnection, such as by lighting a lamp. For example, U.S. Pat. No. 3,611,261 describes such a cable connector, with the resulting signal being used to check circuit continuity. U.S. Pat. No. 4,915,649 describes such a connector being used to light an indicator lamp, providing an indication that the connection has been made. U.S. Pat. No. 3,414,806 describes a connector including a resistive pin which provides electrical resistance if the mating connectors are not fully connected. U.S. Pat. No. 5,061,204 describes such a connector in which a circuit is completed between two contacts when the mating connector is engaged. U.S. Pat. No. 4,903,340 describes the use of a reed switch in an optical data connector, activated by a magnet in the mating connector, to provide such an indication. U.S. Pat. No. 5,273,456 describes a connector having a pair of contacts biased together to touch one another, which are forced apart by a wedge-shaped separator in the mating connector. U.S. Pat. No. 5,127,847 describes mating connectors including a resilient locking arm, a lock verification slider, and a pair of terminals which are electrically connected to indicate that the connectors are properly locked. U.S. Pat. No. 5,674,085 describes a connector including switch contacts operated by the mating connector.

A circuit for detecting whenever a pluggable unit, such as a keyboard or mouse, is connected to, or disconnected from, a computing system without first disconnecting electrical power to the computing system is described in the IBM Disclosure Bulletin, Vol. 38, No. 06b, June, 1993, pp 371–372. A signal line that is electrically grounded within the pluggable unit is tied to an input of a buffer and to a voltage through a pull-up resistor. When the pluggable unit is disconnected with power on in the computing system, this voltage passes through a buffer to set a latch, which is subsequently reset during a power-on reset cycle.

SUMMARY OF THE INVENTION

In accordance with a first aspect of the invention, a motherboard is provided in a computing system. The motherboard includes a circuit board, a microprocessor, a port connector, switching means for selectively connecting the main voltage plane segment to the separate voltage plane segment, and a device interface circuit. The circuit board includes a main voltage plane segment and a separate voltage plane segment. The port connector includes a connection-sensing terminal. The switching means connects the main voltage plane segment to the separate voltage plane segment in response to a determination that the connection-sensing terminal is externally grounded. The switching means also disconnects the main voltage plane segment from the separate voltage plane segment in response to a determination that the connection-sensing terminal is electrically floating. The device interface circuit conditions signals transmitted between the microprocessor and the port connector, drawing electrical power from the separate voltage plane segment. A motherboard many contain a multitude of separate voltage planes, port connectors, and connection sensing terminals.

In a first embodiment of the invention, the switching means includes a biasing resistor and a switching device. The switching device has a control terminal connected to the connection-sensing terminal and connected to a biasing voltage through the biasing resistor, an input terminal connected to the main voltage plane segment, and an output terminal connected to the separate voltage plane segment. The input terminal is connected to the output terminal in response to an application of electrical ground to the control terminal. The input terminal is disconnected from the output terminal in response to an application of the biasing voltage to the control terminal.

In a second embodiment of the invention, the motherboard additionally comprises non-volatile storage. The switching means includes a biasing resistor, first and second registers, a switching device, and a switching routine stored within the non-volatile storage for execution within the microprocessor. The first register includes an input terminal connected to the connection-sensing terminal and connected to a biasing voltage through the biasing resistor. The first register is driven to a first state by an application of electrical ground to the input terminal and to a second state by an application of the biasing voltage to the input terminal. The switching routine executing within the microprocessor drives the second register into a third state in response to a determination that the first register is in the first state. The switching routine executing within the microprocessor drives the second register into a fourth state in response to a determination that the first register is in the second state. The switching device has a control terminal connected to an output of the second register, an input terminal connected to the main voltage plane segment, and an output terminal connected to the separate voltage plane segment. The input terminal is connected to the output terminal in response to a signal applied to the control terminal from the output of the second register when the second register is in the third state. The input terminal is disconnected from the output terminal in response to a signal applied to the control terminal from the output of the second register when the second register is in the fourth state. The various states of a register are, for example, set and reset conditions of the register or of a bit position within the register.

In accordance with another aspect of the invention, a system configuration method for switching electrical power to each device interface circuit within a plurality of device interface circuits is provided. Each device interface circuit conditions signals transmitted between a microprocessor and a port connector electrically connected to the device interface circuit. The system configuration method includes:

for each the device interface circuit, setting a bit position associated with the device interface circuit in a first register to a first state in response to electrically grounding a connection-sensing terminal within the port connector connected to the device interface circuit and to a second state in response to electrically floating the connection-sensing terminal; and for each device interface circuit within the plurality of device interface circuits, performing a port configuration method.

The port configuration method includes:

reading the bit position associated with the device interface circuit within the first register;

reading a bit position associated with the device interface circuit within a second register;

setting a bit position associated with the device interface circuit in the second register to a third state in response to determining that the bit position associated with the device interface circuit in the first register is in the first state and that the bit position associated with the device interface circuit in the second register is in a fourth state;

setting the bit position associated with the device interface circuit in the second register to the fourth state in response to determining that the bit position associated with the device interface circuit in the first register is in the second state and that the bit position associated with the device circuit in the second register is in the third state;

turning a switching device on to conduct electrical power to the device interface circuit in response to setting the bit position associated with the device interface circuit in the second register to the third state; and turning the switching device off in response to setting the bit p position associated with the device interface circuit in the second register to the fourth state.

DETAILED DESCRIPTION OF THE INVENTION

Figure 1:
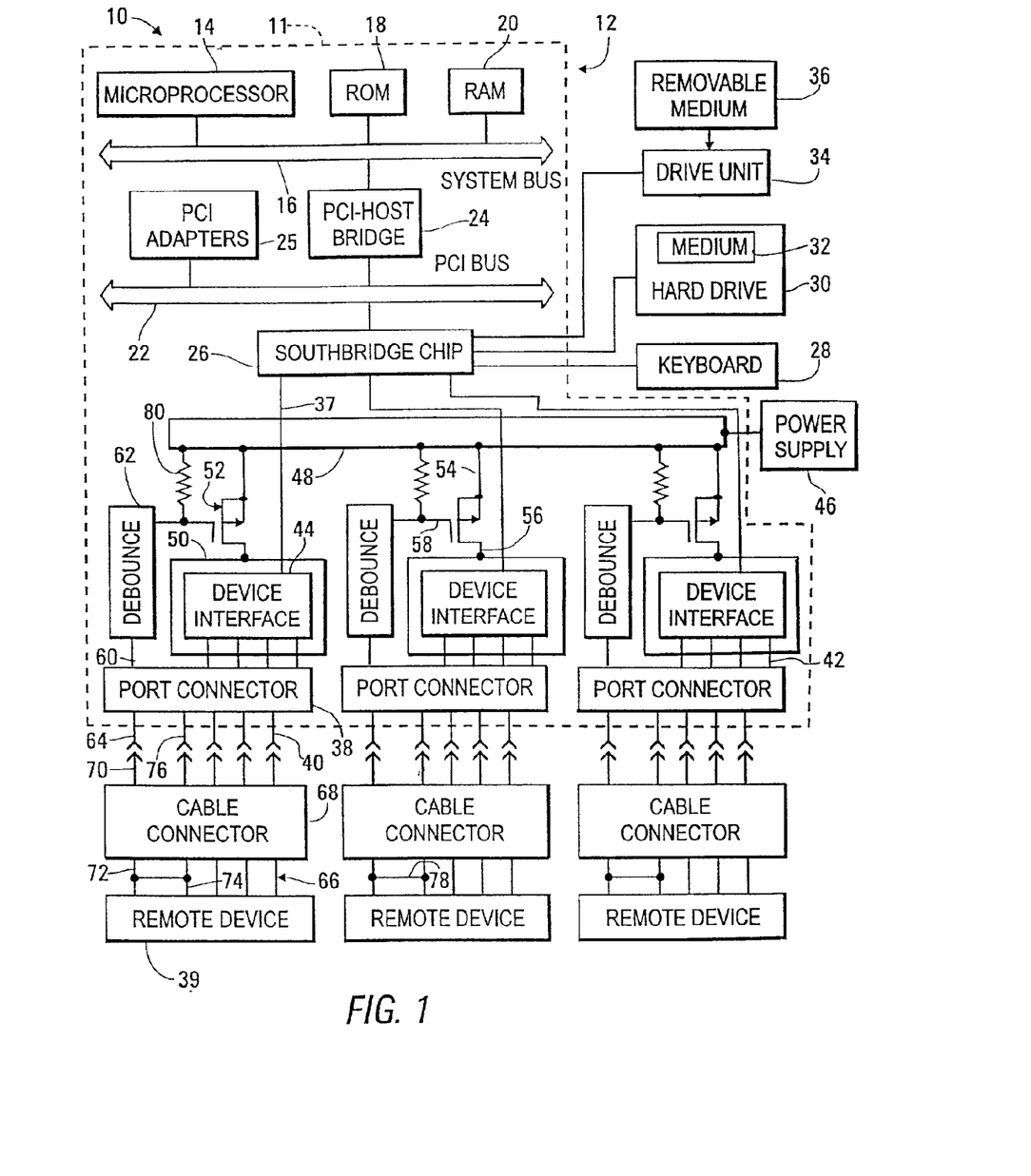
FIG. 1 is a block diagram of a computing system built in accordance with a first embodiment of the invention.

FIG. 1 is a partly schematic block diagram of a computing system 10, built in accordance with a first embodiment of the invention to include a number of elements attached to a circuit board 11 to form a motherboard 12. Thus, the motherboard 12 includes a microprocessor 14 connected by a system bus 16 to a read only memory ROM 18 and a random access memory RAM 20. The system bus is additionally connected to a peripheral component interconnect PCI bus 22 through a PCI-host bridge 24. A number of PCI adapters 25 or option cards may be installed in connectors on the PCI bus 22 to provide various input/output functions. A Southbridge chip 26 provides controller functions and connections between the PCI bus 22 and a number of input/output I/O devices removed from the motherboard 12, including a keyboard 28, providing inputs from the system user, a hard disk drive 30 used to read information from a magnetic medium 32 and to write information to the magnetic medium 32, and a drive unit 34 used to read information from a removable medium 36 and to write information to the removable medium 36. For example, the removable medium 36 is a floppy diskette.

The Southbridge chip 26 also provides specialized connections to a number of port connectors 38 attached to the circuit board 11 to form part of the motherboard 12. Each of the port connectors 38, providing for a cable connection to a remote device 39, includes a number of contact terminals 40, each of which is connected through an associated line 42 to a device interface 44, which also forms part of the motherboard 12. While three port connectors 38 are shown in the example of FIG. 1, a typical system includes a larger number of port connectors, each of which may be connected in the manner described herein. The individual port connectors 38 may be of various types, including serial ports, parallel ports, specialized connections to local area networks (LANs), connections to telephone lines from modems, USB ports, etc., with each device interface 44 being of a particular type configured to condition signals transmitted between the microprocessor 14 and the port connector 38 for the particular type of port connection.

Electrical power to operate the device interfaces 44 at a positive voltage $V_{CC}$ is provided from a power supply 46 through a main voltage plane section 48 within the circuit board 11. In accordance with the invention, each device interface 44 is powered through a separate voltage plane section 50 electrically connected to the main voltage plane section 48 through a switching transistor 52 also attached to the circuit board 11. It is understood that these voltage plane sections 48, 50 are actually conductive planes extending within a portion of the multi-plane laminated circuit board 11, with each of the voltage plane sections 50 providing a number of individual power connections to various points within the associated device interface 44, and with the main voltage plane section 48 providing a number of individual power connections to the switching transistors 52 and to other devices forming a part of the motherboard 12.

In the example of FIG. 1, each of the switching transistors 52 is a p-channel MOSFET transistor having a source 54 connected to the positive voltage $V_{CC}$ through the main voltage plane section 48, having a sink 56 connected to power inputs of the associated device interface 44 through the separate voltage plane section 50, and having a gate 58 connected to a line 60 through a debounce circuit 62. The switching transistor 52 is understood to be an example of a switching device including a control terminal, such as the gate 58, an input terminal, such as the source 54, and an output terminal, such as the sink 56.

The line 60 is connected to a connection-sensing terminal 64 within the associated port connector 38. In the cable 66 removably engaging the port connector through a mating cable connector 68, the connection-indicating terminal 70 engaging the connection-sensing terminal 64 is electrically grounded. For example, the line 72 is connected to another line 74, which is grounded through a connection to a grounded terminal 76 within the port connector 38. This connection 78 between the lines 72 and 74 may be made within the cable connector 68, the cable 66, or the remote device 39. The ground indicating terminal 70 may be an extra terminal, otherwise not used in the connection between the port connector 38 and the remote device 39, or it may be one of a number of grounding terminals taken to be used for this purpose.

The gate 58 if each of the switching transistors 52 connected both to the connection-sensing terminal 64, through the debounce circuit 62, and to the positive power supply voltage $V_{CC}$ through a pull-up resistor 80. When the cable connector 68 is not connected to the port connector 38, the transistor gate 58 is pulled up to the positive power supply voltage $V_{CC}$ through the pull-up resistor 80. With the transistor source 54 and the gate 58 thus at the same voltage, the switching transistor 52 is turned off, so that current does not flow between the source 54 and the sink 56. Thus, when the cable connector 68 is not connected to the port connector 38, electrical current from the power supply 46 does not flow into the associated device interface 44 through its separate voltage plane section 50.

On the other hand, when the cable connector 68 is connected to the port connector 38, the gate 58 of the switching transistor 54 is connected to ground through the connection-sensing terminal 64 and the debounce circuit 62, resulting in a difference between the potential of the transistor source 54 and the gate 58 sufficient to turn the switching transistor 54 on, so that current flows between the main voltage plane section 48 and the separate voltage plane 50 providing electrical power to the particular device interface 44 associated with the switching transistor 54.

Thus, in accordance with the first embodiment, the electrical power driving the device interface 44 of a particular port connector 38 is turned on whenever the power supply 46 is turned on to produce a voltage output on the main voltage plane section 48 with a remote device 39 already connected to the port connector 38, and additionally whenever a remote device 39 is connected to the port connector 38 with the power supply 46 already turned on. The electrical power driving the device interface 44 of a particular port connector 38 is then turned off whenever the remote device 39 is disconnected from the port connector 38. Additionally, since the voltage $V_{CC}$ from the power supply 46 goes away as the power supply 46 is shut off, electrical power to the device interface 44 is turned of when the power supply is turned off, even when the remove device 39 remains connected to the port connector 38.

Each debounce circuit 62 is, for example, a conventional device including one or more reactive elements, such as capacitors and inductors to slow a rate at which the voltage driving the associated transistor gate 58 can rise or drop when a remote device 39 is attached or removed from the associated port connector 38. The use of the debounce circuit 62 avoids multiple switching of the transistor 52, which may otherwise occur as the remote device 39 is plugged into or unplugged from the port connector 38.

Electrically connected elements associated with each port, including the port connector 38, the device interface circuit 44, the switching transistor 52, the debounce circuit 62, and the pull-up resistor 52, are considered to be a connection subsystem.

Figure 2:
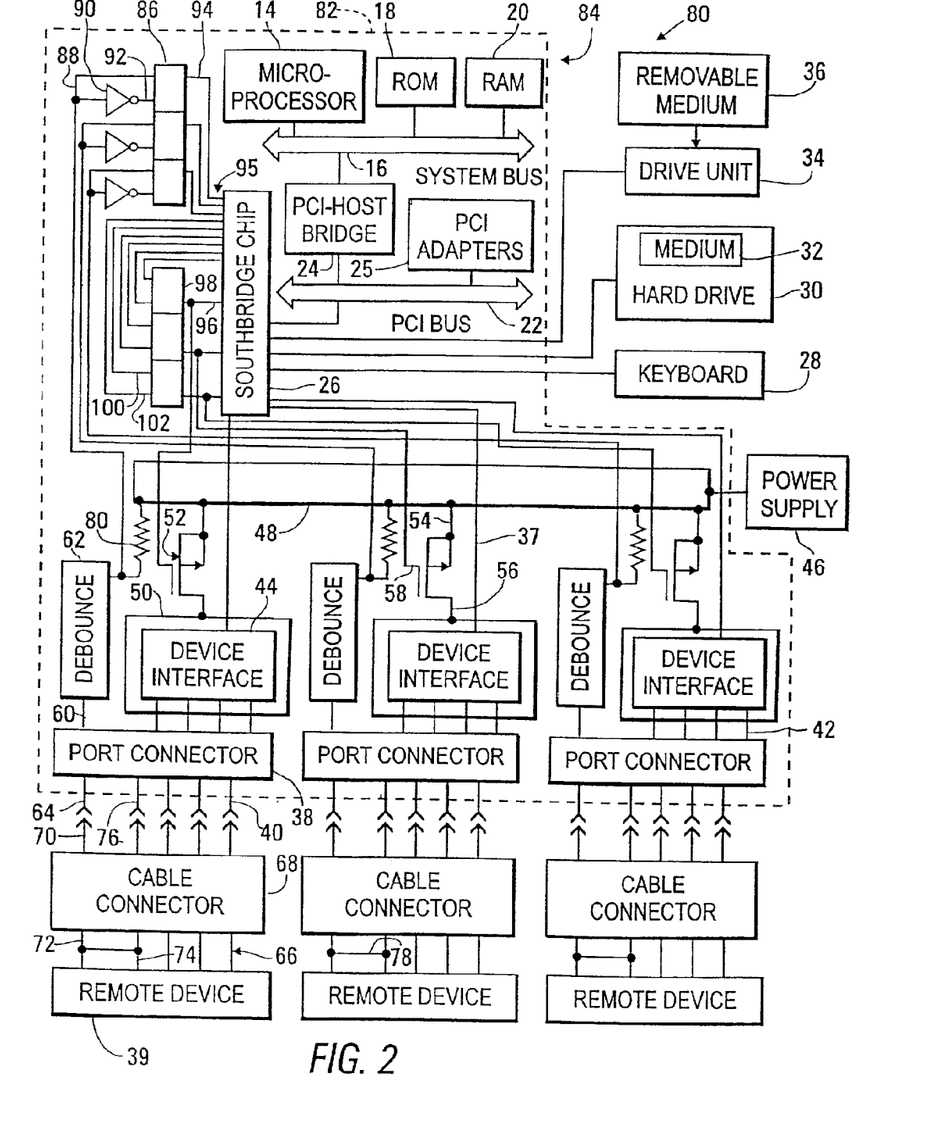
FIG. 2 is a block diagram of a computing system built in accordance with a second embodiment of the invention.

FIG. 2 is a partly schematic block diagram of a computing system 80, built in accordance with a second embodiment of the invention to include a number of elements attached to a circuit board 82 to form a motherboard 84. The computing system 80 includes a number of elements which are similar or identical to elements within the computing system 10, which have been described above in reference to FIG. 1. Such elements are therefore accorded like reference numbers.

The computing system 80 built in accordance with the second embodiment of the invention is similar to the computing system 10 built in accordance with the first embodiment of the invention, in that the motherboard 84 of the computing system 80 has a main voltage plane 48 driven to a voltage level $V_{CC}$ by a power supply 46 and a separate voltage plane 50 supplying electrical power to each device interface 44, at the voltage level $V_{CC}$ only when a switching transistor 52 is turned on to conduct this voltage between a transistor source 54 and a transistor sink 56. In both the computing systems 10, 80 the switching transistors 52 are turned off in response to disconnecting a remote device 39 from the port connector 38 through which signals are driven from the device interface 44, and on in response to connecting a remote device 39 to this port connector 38.

However, while the outputs of the connection-sensing terminals 64 are connected to the transistor gates 58 through the debounce circuits 62 in accordance with the first embodiment of the invention, the outputs of the connection-sensing terminals 64 are connected as inputs to a first register 86 in accordance with the second embodiment of the invention. Specifically, each connection-sensing terminal 64 is connected through a debounce circuit 60 to a n input line 88 setting a bit within the first register 86, to an input line 90 resetting the same bit through an inverter 88, and to the main voltage plane segment 48 through the associated pull-up resistor 80.

Thus, in the second embodiment of the invention, when the remote device 39 is disconnected from the port connector 38, the input 88 is pulled high, to the voltage $V_{CC}$ of the main voltage plane segment 48, while the input 92 is held low through the inverter 90, causing the associated bit within the first register 86 to be set and to remain set. On the other hand, when the remote device 39 is connected to the port connector 38, the grounding of the connection-sensing terminal 64 causes the input 88 to be pulled low, to electrical ground, while the input 92 is driven high through the inverter 90, causing the associated bit within the first register 86 to be reset and to remain reset. In this way, the value of each bit within the first register 86 is caused to follow the connection status of an associated cable connector 68, with the set, or logical "one" condition of the bit indicating that no remote device 39 is connected to the cable connector 68, and with the reset, or logical "zero" condition of the bit indicating that a remote device 39 is connected to the cable connector 68.

The outputs 94 of the first register are provided as inputs to the Southbridge chip 26 at general purpose input/output (GPIO) pins 95 of the chip 26, so that a routine executing within the microprocessor 14 can use the data stored within the first register 86 to determine when electrical power is to be supplied to the separate voltage plane 50 providing such power to the associated device interface 44 and to optionally to determine when drivers associated with the device interface 44 are to be loaded and unloaded.

Additionally, while the inputs to the transistor gates 58 are connected to outputs of the connection-sensing terminals 64 through the debounce circuits 62 in accordance with the first embodiment of the invention, the inputs to the transistor gates 58 are connected to the outputs 96 of a second register 98 in accordance with the second embodiment of the invention. The outputs 96 are those outputs that have a high, or "one" value when the corresponding bit within the second register 98 is set and a low or "zero" value when this bit is reset. Both the inputs 100 used to set bits within the second register 98 and the inputs 102 used to reset these bits are connected as outputs from the GPIO pins 95 of the Southbridge chip 26, so that a routine executing within the microprocessor 14 can set and reset each of the bits stored within the second register 98.

Figure 3:
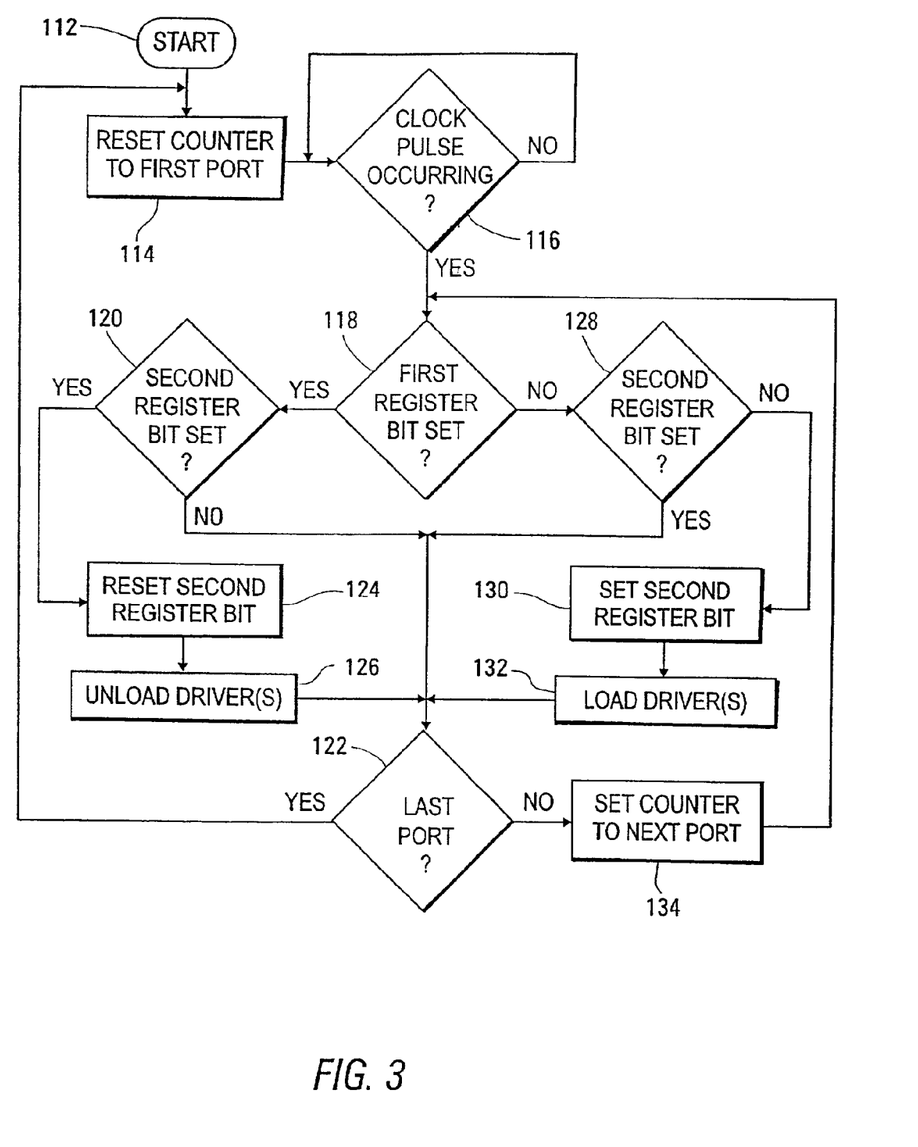
FIG. 3 is a flow chart of a routine executing within a microprocessor in the computing system of FIG. 2 to switch power in response to a change in connection status.

FIG. 3 is a flow chart of a routine 110 executing within the microprocessor 14 of the computing system 80 in accordance with the second embodiment of the present invention.

Referring to FIGS. 2 and 3, this routine 110 responds to the outputs 94 of the first register 86 to set a bit within the second register 98 when a remote device 39 is plugged into the corresponding port connector 38 and to reset this bit when no remote device 39 is plugged into this port connector 38. When such a bit is not set, the corresponding output 96 of the second register 96 at a high level drives the corresponding transistor gate 58 to a high level, turning the switching transistor 52 off, so that current is not conducted between the transistor source 54 and the transistor sink 56. When such a bit is set, the corresponding output 96 at a low level drives the corresponding transistor gate 58 to a low level, turning the switching transistor 52 on, so that current is connected between the transistor source 54 and the transistor sink 56, placing the voltage $V_{CC}$ of the main voltage plane section 48 on the corresponding separate voltage plane 50.

In accordance with a preferred version of the second embodiment of the invention, the routine 110 begins execution in step 112 after the completion of at least a portion of an initialization routine stored in ROM 18, with the routine 110 preferably also being stored in ROM 18 as a part of the initialization routine. The routine 110 continues execution as a background program as long as electrical power remains on in the computing system 80. In this way, the routine 110, being supplied as firmware stored within the ROM 18 becomes part of the motherboard 84, along with the various hardware elements needed for operation in accordance with the second embodiment. The ROM 18, which may actually be an EEPROM according to common practice, stores routines for execution in a non-volatile manner, so that such routines remain in storage when electrical power is turned off. Alternately, the routine 110 may be loaded from the removable medium 36 and stored on the medium 32 of the hard disk drive 30 to be accessed by an operating system executing within the microprocessor 14.

In general, the system 80 includes a number of port connectors 38, forming parts of a number of ports, for which connection status is examined one port at a time during execution of the routine 110. Therefore, the routine 110 tracks a counter variable indicating the port for which connection status is currently being examined. After the routine 110 starts in step 112, this counter is reset in step 114, so that connection status for the first port will be examined.

Various operations of the routine 110 are performed in response to a clock pulse, which may be generated particularly for use by the routine 110 in a manner well known to those skilled in the related arts. The clock pulse signal may have a period between pulses of several seconds, allowing effective operation to tell if a remote device 39 has been plugged-in or unplugged without consuming a significant amount of processor time. Therefore, in step 116, a determination is made of whether a clock pulse is occurring. If it is not, the system returns to wait for the next clock pulse.

When a clock pulse is determined to be occurring in step 116, the system proceeds to step 118, in which the bit corresponding to the port identified by the counter variable within the first register 86 is examined. If this bit is set, indicating that no remote device 39 is connected to the corresponding cable connector 38, the system proceeds to step 120, in which the bit corresponding to the port identified by the counter variable within the second register 98 is examined. If this bit within the second register 98 is not set, the associated switching transistor 52 is already turned off, so no further changes regarding this port are required, allowing the system to proceed to step 122, in which a determination is made of whether connection status for the last port has been examined.

On the other hand, if a determination is made in step 120 that this bit in the second register 98 is set, this bit is reset in step 124, turning the associated switching transistor 52 off. Then, in step 126, one or more driver routines associated with the port identified by the counter variable are preferably unloaded before the system proceeds to step 122.

When a determination is made in step 118 that the bit corresponding to the port identified by the counter variable within the first register 86 is not set, indicating that a remote device 39 is connected to the corresponding cable connector 38, the system proceeds to step 128, in which the bit corresponding to the port identified by the counter variable within the second register 98 is examined. If this bit within the second register is set, the associated switching transistor is already turned off, so no further changes regarding this port are required, allowing the system to proceed to step 122.

On the other hand, if a determination is made in step 128 that this bit in the second register 98 is not set, this bit is set in step 130, turning the associated switching transistor 52 on. Then, in step 132, one or more driver routines associated with the port identified by the counter variable are preferably loaded before the system proceeds to step 122.

If it is determined in step 122 that the port for which connection status has been most recently examined is not the last port in the computing system 80, according to the sequence in which connection status for the ports are examined, the counter variable is set in step 134 to provide for the examination of connection status for the next port, with the system returning to step 118 to repeat the processes described above for such data.

If it is determined in step 122 that the port for which connection status has most recently been examined in indeed the last port, the system returns to step 114, in which the counter variable is reset to examine connection status for the first port. Then the system proceeds to step 116 to wait for the next clock pulse.

Because the loading and unloading of device driver routines in steps 126 and 132 may require significant and somewhat unpredictable periods of time, it is conceivable that one or more additional clock pulse will occur during the process of examining connection status for all of the ports within the system 80. However, since the system does not return to determine in step 116 whether a clock pulse is occurring until connection status for each of the ports has been examined, as determined within step 122, such additional clock pulses are ignored, allowing the completion of the process of examining connection status for all ports.

Because the process begun by determining in steps 118 and 120 that the first and second register bits are both set includes both resetting the second register bit in step 124 and unloading driver(s) in step 126, these drivers are unloaded only once when the remote device 39 is disconnected from the port connector 38. Similarly, because the process begun by determining in step 118 and 128 that the first and second register bits are both not set includes both setting the second register bit in step 130 and loading driver(s) in step 132, these drivers are loaded only once when the remote device is connected to the port connector 38.

According to a preferred version of the second embodiment, data stored within the second register 96 is used to present a specific error message when an attempt is made to use a port, by writing to the port or by reading from it, through a port connector 38 to which an external device 39 is not attached by means of a cable. An exemplary method for doing this will now be discussed, with particular references being made to FIGS. 4–7, and with continued references being made to FIG. 2.

Figures 4, 5, 6, 7:
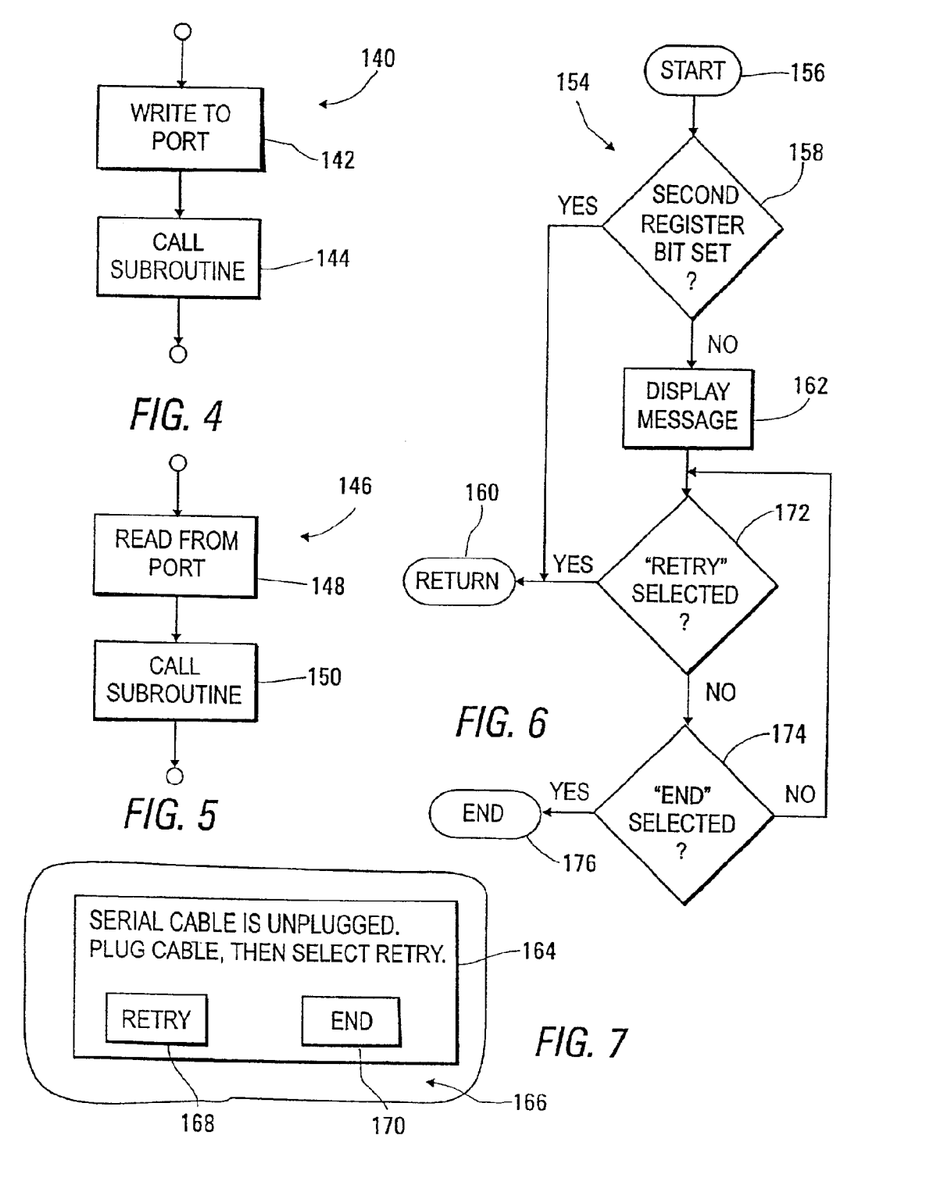
FIG. 4 is a fragmentary flow chart of a routine executing within the microprocessor in the computing system of FIG. 2 to write data to a port.
FIG. 5 is a fragmentary flow chart of a routine executing within the microprocessor in the computing system of FIG. 2 to read data from a port.
FIG. 6 is a flow chart of a subroutine called by the routines of FIGS. 4 and 5.
FIG. 7 is a display view of a message displayed during execution of the subroutine of FIG. 6.

FIG. 4 is a fragmentary flow chart of a routine 140 executing within the microprocessor 14 of the computing system 80 to write data to a port. The process of writing to the port, begun in step 142, includes step 144, in which a subroutine to be described in reference to FIG. 6 is called.

FIG. 5 is a fragmentary flow chart of a routine 146 executing within the microprocessor 14 of the computing system 80 to read data from a port. The process of reading from the port, begun in step 148, includes step 150, in which a subroutine to be described in reference to FIG. 6 is called.

FIG. 6 is a flow chart of a subroutine 154 called by the routine 140 in step 144 and by the routine 146 in step 150. After this subroutine 154 begins in step 156, the second register 98 is examined in step 158 to determine whether the bit corresponding to the port to which an attempt is being made to write in step 142, or from which an go is being made to read in step 148 is set. If this bit is set, indicating that a remote device 39 is connected to this port, and additionally that electrical current is being supplied to the device interface 44 through which data will be written or read, the system proceeds to step to return to the calling routine 140 or 146. Then the process of writing to this port or of reading from this port continues in a conventional manner. On the other hand, if it is determined in step 158 that this bit is not set, indicating that a remote device 39 is not connected to this port, and additionally that electrical current is not being supplied to the device interface 44 through which data will be written or read, an error message is displayed in step 162.

FIG. 7 is a display view of a dialog box 164, including an error message, displayed at step 162 during the execution of the subroutine 154. The dialog box 164, which is displayed in a conventional manner on a display screen 166 of the computing system 80, indicates that an identified cable, in this case the serial cable, is not connected and advises that this cable should be reconnected before the "retry" command button 168 is selected. If the user cannot reconnect the cable, or if he does not want to do so, he should respond by selecting the "end" command button 170. If the "retry" button 168 is selected without connecting the cable, the system will return to display the dialog box 164 again.

After step 162, the system executing the subroutine 154 maintains the display of the dialog box 164 until one of the command buttons 168,170 is selected. If the "retry" command button 168 is selected, as determined in step 172, the system proceeds to step to return to the calling routine 140 or 146 to continue the process of writing to the port, or of reading from it, in a conventional manner. If the "end" command button 170 is selected, as determined in step 174, the subroutine 154 ends in step 176, preferably with the attempt to write to the port or read from it also being ended.

The method described above in reference to FIGS. 4–7 has a particular advantage over the prior art method of U.S. Pat. No. 6,149,464 in that a determination is made that a necessary cable is disconnected before an error is allowed to occur. The process of writing to the port, or of reading from it, which cannot be completed in the absence of the cable connection, is paused by calling the subroutine 154, through which the user is given an opportunity to connect the cable before completing the cable connection. Preferably, this pause allows the write or read operation to be subsequently completed without a loss of data. On the other hand, the method of U.S. Pat. No. 6,149,464 requires the detection of an error before a determination is made of whether a remote device is connected.

The apparatus of the invention additionally has an advantage over the apparatus of U.S. Pat. No. 6,149,464, and over other prior art apparatus, in that all of the apparatus required for providing the automatic switching of power to the device interfaces 44 is provided as a part of the motherboard in accordance with the present invention. Preferably, in the second embodiment, even the code described above in reference to FIGS. 3–6 is included in the form of firmware shipped within the ROM 18 as part of the motherboard 84. There is no need to provide a special power supply having a switching capability.

The method and apparatus of the invention provide for terminating electrical power to each of the individual device interface circuits 44 when it is not needed, as determined by a lack of a connection to the port connector 38 associated with the particular device interface circuit 44. Terminating power under this condition can substantially reduce the rate at which electrical energy is used. Since the rate of energy usage is particularly important in a portable computing system, the power supply 46 is understood to include a battery-powered power supply, with an advantage of increased battery life being achieved.

While the preceding discussion has described the switching of only one positive voltage, $V_{CC}$, it is understood that the apparatus and method can be extended within the scope of the invention to switch a negative voltage and to switch several voltages between several sets of main voltage plane sections, such as main voltage plane section 48, and several corresponding separate voltage plane sections, such as separate voltage plane section 50, based on the voltage requirements of the various device interface circuits 44. Different voltages are understood to require different switching transistor configurations, of which the transistors 52 are considered exemplary, with such different switching transistor configurations possibly including cascaded transistors to obtain the necessary voltage conditions for switching.

While the invention has been described as being used to individually switch voltage planes associated with each of a number of ports, it is understood that only one or more ports within a number of ports provided in a computing system may be addressed in this manner within the scope of the invention.

While the invention has been described in its preferred versions or embodiments with some degree of particularity, it is understood that this description has been given only by way of example, and that numerous changes in the arrangement of parts and process steps may be made without departing from the spirit and scope of the invention.

What is claimed is:

1. A motherboard in a computing system, wherein said motherboard comprises:

a circuit board including a main voltage plane segment and a separate voltage plane segment;

a microprocessor;

a port connector including a connection-sensing terminal;

switching means for selectively connecting said main voltage plane segment to said separate voltage plane segment, wherein said switching means connects said main voltage plane segment to said separate voltage plane segment in response to a determination that said connection-sensing terminal is externally grounded, and wherein switching means disconnects said main voltage plane segment from said separate voltage plane segment in response to a determination that said connection-sensing terminal is electrically floating; and a device interface circuit conditioning signals transmitted between said microprocessor and said port connector, wherein said device interface circuit draws electrical power from said separate voltage plane segment.

2. The motherboard of claim 1, wherein said switching means includes a biasing resistor and a switching device, said switching device has a control terminal connected to said connection-sensing terminal and connected to a biasing voltage through said biasing resistor, an input terminal connected to said main voltage plane segment, and an output terminal connected to said separate voltage plane segment, said input terminal is connected to said output terminal in response to an application of electrical ground to said control terminal, and said input terminal is disconnected from said output terminal in response to an application of said biasing voltage to said control terminal.

3. The motherboard of claim 2, wherein said switching device includes a field effect transistor, said control terminal includes a gate of said field effect transistor, said input terminal includes a source of said field effect transistor, and said output terminal includes a sink of said field effect transistor.

4. The motherboard of claim 2, wherein said biasing resistor is connected to said biasing voltage at said main voltage plane.

5. The motherboard of claim 1, wherein said motherboard additionally comprises non-volatile storage, said switching means includes a biasing resistor, first and second registers, a switching device, and a switching routine stored within said nonvolatile storage for execution within said microprocessor, said first register includes an input terminal connected to said connection-sensing terminal and connected to a biasing voltage through said biasing resistor, said first register is driven to a first state by an application of electrical ground to said input terminal and to a second state by an application of said biasing voltage to said input terminal, said switching routine executing within said microprocessor drives said second register into a third state in response to a determination that said first register is in said first state, said switching routine executing within said microprocessor drives said second register into a fourth state in response to a determination that said first register is in said second state, said switching device has a control terminal connected to an output of said second register, an input terminal connected to said main voltage plane segment, and an output terminal connected to said separate voltage plane segment, said input terminal is connected to said output terminal in response to a signal applied to said control terminal from said output of said second register when said second register is in said third state, and said input terminal is disconnected from said output terminal in response to a signal applied to said control terminal from said output of said second register when said second register is in said fourth state.

6. The motherboard of claim 5, wherein said switching device includes a field effect transistor, said control terminal includes a gate of said field effect transistor, said input terminal includes a source of said field effect transistor, and said output terminal includes a sink of said field effect transistor.

7. The motherboard of claim 5, wherein said biasing resistor is connected to said biasing voltage at said main voltage plane.

8. The motherboard of claim 5, wherein said switching routine executing within said microprocessor periodically examines a state of said first register in response to clock pulses.

9. The motherboard of claim 5, wherein said switching routine executing within said microprocessor additionally causes a device driver routine used to condition signals transferred through said port connector to be loaded in response to a determination that said first register is in said first state and that said second register is in said third state.

10. The motherboard of claim 5, wherein said switching routine executing within said microprocessor additionally causes a device driver routine used to condition signals transferred through said port connector to be unloaded in response to a determination that said first register is in said second state and that said second register is in said fourth state.

11. The motherboard of claim 5, wherein said non-volatile storage additionally holds a system pausing subroutine for execution within said microprocessor in response to an attempt to write or read data through said port connector, said system pausing subroutine causes a message to be displayed indicating a cable is disconnected and provides a graphical user interface for selecting a retry after said cable is connected, in response to a determination that said second register is in said fourth state, and said system pausing subroutine causes said attempt to write or read data through said port connector to be retried in response to receiving a selection of said retry from said graphical user interface.

12. A motherboard in a computing system, wherein said motherboard comprises:

a circuit board including a main voltage plane segment;

a microprocessor; and a plurality of connection subsystems, wherein each connection system within said plurality of connection subsystems includes:

a separate voltage plane segment within said circuit board;

a port connector including a connection-sensing terminal;

switching means for selectively connecting said main voltage plane segment to said separate voltage plane segment, wherein said switching means connects said main voltage plane segment to said separate voltage plane segment in response to a determination that said connection-sensing terminal is externally grounded, and wherein switching means disconnects said main voltage plane segment from said separate voltage plane segment in response to a determination that said connection-sensing terminal is electrically floating; and a device interface circuit conditioning signals transmitted between said microprocessor and said port connector, wherein said device interface circuit draws electrical power from said separate voltage plane segment.

13. The motherboard of claim 12, wherein, within each said connection subsystem,
- said switching means includes a biasing resistor and a switching device,
- said switching device has a control terminal connected to said connection-sensing terminal and connected to a biasing voltage through said biasing resistor, an input terminal connected to said main voltage plane segment, and an output terminal connected to said separate voltage plane segment,
- said input terminal is connected to said output terminal in response to an application of electrical ground to said control terminal, and
- said input terminal is disconnected from said output terminal in response to an application of said biasing voltage to said control terminal.

14. The motherboard of claim 12,
wherein said motherboard additionally comprises first and second registers and non-volatile storage storing a switching routine for execution within said microprocessor,
wherein, within each said connection subsystem,
- said switching means includes a biasing resistor, bit positions within said first and second registers, and a switching device,
- said bit position within said first register includes an input terminal connected to said connection-sensing terminal and connected to a biasing voltage through said biasing resistor, and
- said bit position within said first register is driven to a first state by an application of electrical ground to said input terminal and to a second state by an application of said biasing voltage to said input terminal,
- said switching routine executing within said microprocessor drives said bit position within said second register into a third state in response to a determination that bit position of said first register is in said first state,
- said switching routine executing within said microprocessor drives said second register into a fourth state in response to a determination that said bit position in said first register is in said second state, and
wherein, within each said connection subsystem,
- said switching device has a control terminal connected to an output of said second register, an input terminal connected to said main voltage plane segment, and an output terminal connected to said separate voltage plane segment,
- said input terminal is connected to said output terminal in response to a signal applied to said control terminal from said output of said second register when said second register is in said third state, and
- said input terminal is disconnected from said output terminal in response to a signal applied to said control terminal from said output of said second register when said second register is in said fourth state.

15. The motherboard of claim 14, wherein for each said connection subsystem, said switching routine executing within said microprocessor additionally causes a device driver routine used to condition signals transferred through said port connector to be loaded in response to a determination that said first register is in said first state and that said second register is in said third state.

16. The motherboard of claim 14, wherein for each said connection subsystem, said switching routine executing within said microprocessor additionally causes a device driver routine used to condition signals transferred through said port connector to be unloaded in response to a determination that said first register is in said second state and that said second register is in said fourth state.

17. The motherboard of claim 14, wherein
- said non-volatile storage additionally holds a system pausing subroutine for execution within said microprocessor in response to an attempt to write or read data through a port connector within a connection subsystem in said plurality of connection subsystems,
- said system pausing subroutine causes a message to be displayed indicating an external cable to said port connector is disconnected and provides a graphical user interface for selecting a retry after said external cable is connected, in response to a determination that said second register within said connection subsystem is in said fourth state, and
- said system pausing subroutine causes said attempt to write or read data through said port connector to be retried in response to receiving a selection of said retry from said graphical user interface.

18. A system configuration method for switching electrical power to each device interface circuit within a plurality of device interface circuits, wherein each said device interface circuit conditions signals transmitted between a microprocessor and a port connector electrically connected to said device interface circuit, and wherein said system configuration method comprises:
- for each said device interface circuit, setting a bit position associated with said device interface circuit in a first register to a first state in response to electrically grounding a connection-sensing terminal within said port connector connected to said device interface circuit and to a second state in response to electrically floating said connection-sensing terminal; and
- for each device interface circuit within said plurality of device interface circuits, performing a port configuration method including:
  - reading said bit position associated with said device interface circuit within said first register;
  - reading a bit position associated with said device interface circuit within a second register;
  - setting a bit position associated with said device interface circuit in said second register to a third state in response to determining that said bit position associated with said device interface circuit in said first register is in said first state and that said bit position associated with said device interface circuit in said second register is in a fourth state;
  - setting said bit position associated with said device interface circuit in said second register to said fourth state in response to determining that said bit position associated with said device interface circuit in said first register is in said second state and that said bit position associated with said device circuit in said second register is in said third state;
  - turning a switching device on to conduct electrical power to said device interface circuit in response to setting said bit position associated with said device interface circuit in said second register to said third state; and
  - turning said switching device off in response to setting said bit p position associated with said device interface circuit in said second register to said fourth state.

19. The method of claim 18, wherein said port configuration method additionally includes:

loading a device driver routine used during operation of said device interface circuit in response to determining that said bit position associated with said device interface circuit in said first register is in said first state and that said bit position associated with said device interface circuit in said second register is in said fourth state; and unloading a device driver routine used during operation of said device interface circuit in response to determining that said bit position associated with said device interface circuit in said first register is in said second state and that said bit position associated with said device circuit in said second register is in said third state.

20. The system configuration method of claim 18, additionally comprising:

following a first step attempting to write data through a device interface circuit in said plurality of device interface circuits, performing a system pausing method comprising:

reading a bit position set to indicate whether electrical power is supplied to said device interface circuit;

in response to determining that electrical power is not supplied to said device interface circuit, displaying a message indicating a cable is not attached to said port connector electrically connected to said device interface circuit and providing a graphical user interface allowing a user selection to continue after connecting a cable to said port connector; and in response to receiving an input from said graphical user interface, again attempting to write data through said device interface circuit; and following a first step attempting to read data through a device interface circuit in said plurality of device interface circuits, performing a system pausing method comprising:

reading a bit position set to indicate whether electrical power is supplied to said device interface circuit;

in response to determining that electrical power is not supplied to said device interface circuit, displaying a message indicating a cable is not attached to said port connector electrically connected to said device interface circuit and providing a graphical user interface allowing a user selection to continue after connecting a cable to said port connector; and in response to receiving an input from said graphical user interface, again attempting to read data through said device interface circuit.

* * * * *